United States Patent
Levy et al.

(10) Patent No.: US 9,405,134 B2
(45) Date of Patent: Aug. 2, 2016

(54) INTERCHANGEABLE SLEEVES FOR EYEGLASSES

(71) Applicant: NAVAJO MANUFACTURING COMPANY, INC., Denver, CO (US)

(72) Inventors: Gordon Levy, Golden, CO (US); Hoi Kwan Wong, Thornton, CO (US)

(73) Assignee: Navajo Manufacturing Company, Inc., Denver, CO (US)

( * ) Notice: Subject to any disclaimer, the term of this patent is extended or adjusted under 35 U.S.C. 154(b) by 22 days.

(21) Appl. No.: 14/290,627

(22) Filed: May 29, 2014

(65) Prior Publication Data

US 2015/0346518 A1    Dec. 3, 2015

(51) Int. Cl.
*G02C 11/02* (2006.01)
*G02C 5/14* (2006.01)

(52) U.S. Cl.
CPC . *G02C 11/02* (2013.01); *G02C 5/14* (2013.01)

(58) Field of Classification Search
CPC .................................. G02C 11/02; G02C 5/14
USPC ............. 351/51, 52, 111, 115, 116, 117, 122; 2/13; D02/895
See application file for complete search history.

(56) References Cited

U.S. PATENT DOCUMENTS

| | | | |
|---|---|---|---|
| 3,021,753 A | 2/1962 | Vinson | |
| 3,582,192 A | 6/1971 | Gitlin | |
| 4,958,923 A | 9/1990 | Rosenson | |
| 5,440,355 A * | 8/1995 | Ross | G02C 11/00 351/122 |
| 5,528,800 A * | 6/1996 | Kliot | 24/3.3 |
| 6,957,890 B2 | 10/2005 | Shapiro | |
| 7,032,246 B1 | 4/2006 | LeMire | |
| 7,559,644 B1 * | 7/2009 | Lloyd | 351/51 |
| 7,621,633 B1 | 11/2009 | Foster | |
| 7,891,807 B2 | 2/2011 | Mansuy | |
| 8,167,426 B2 | 5/2012 | Lampru | |
| 2001/0043308 A1 * | 11/2001 | Menuck et al. | 351/111 |
| 2010/0002186 A1 | 1/2010 | Zelman | |
| 2011/0234971 A1 * | 9/2011 | Yeh | 351/111 |
| 2012/0113381 A1 * | 5/2012 | Jacquier et al. | 351/51 |
| 2013/0329181 A1 | 12/2013 | Gardaz | |
| 2014/0160421 A1 * | 6/2014 | Kavana | 351/43 |
| 2014/0268003 A1 * | 9/2014 | Scudder | G02C 11/02 351/51 |

* cited by examiner

*Primary Examiner* — Darryl J Collins
(74) *Attorney, Agent, or Firm* — Studebaker & Brackett PC

(57) ABSTRACT

A pair of eyeglasses is accessorized with a different appearance by the purchase of only a single pair of eyeglasses. This is accomplished by having removable and interchangeable sleeves for fitting over the temples of a pair of eyeglasses. Opposite sides of each of the sleeves are of different color, ornamentation or other decoration.

9 Claims, 2 Drawing Sheets

INTERCHANGEABLE SLEEVES FOR EYEGLASSES

FIELD OF THE INVENTION

The present invention relates to a pair of glasses having two temples, with removable sleeves covering the temples.

BACKGROUND OF THE INVENTION

With today's ever-changing fashion trends, it is important to have a variety of differently decorated fashion accessories. Therefore, individuals often have multiples of a single item with each of the items being different in shape and/or appearance. This leads to ever-increasing costs for individuals chasing changing fads and trends.

SUMMARY OF THE INVENTION

It is an object of the present invention to accessorize a pair of eyeglasses with a different appearance by the purchase of only a single pair of eyeglasses. This is accomplished by having removable and interchangeable sleeves for fitting over the temples of a pair of eyeglasses. Opposite sides of each of the sleeves are of different color, ornamentation or other decoration.

For example, opposite sides of the sleeves may be of two disparate colors. The wearer would have a choice of reversing the sleeves between the two temples and thereby changing the appearance of the pair of eyeglasses. The sleeves are of flexible, soft plastic so that the sleeves may be slid onto the temples and adapt to a curvature of the temples. The temples are usually made of metal or rigid plastic.

It is therefore an object of the present invention to provide a single pair of eyeglasses having multiple appearances.

It is another object of the present invention to provide a single pair of eyeglasses having multiple appearances, with sleeves being slidable on the temples of the eyeglasses for removal and positioning on an opposite temple.

It is still yet another object of the present invention to provide a single pair of eyeglasses having multiple appearances, with sleeves being slidable on the temples of the eyeglasses for removal, positioning on an opposite temple and the sleeves having different colors on opposite sides.

It is still further another object of the present invention to provide a single pair of eyeglasses having multiple appearances, with sleeves being slidable on the temples of the eyeglasses for removal, positioning on an opposite temple, the sleeves having different colors on opposite sides and the sleeves being slidable until coming into abutment with a portion of the temple so as to provide a seamless appearance.

These and other objects of the invention, as well as many of the intended advantages thereof, will become more readily apparent when reference is made to the following description taken in conjunction with the accompanying drawings.

BRIEF DESCRIPTION OF THE DRAWINGS

The following drawings illustrate examples of various components of the invention disclosed herein, and are for illustrative purposes only. Other embodiments that are substantially similar can use other components that have a different appearance.

DETAILED DESCRIPTION OF THE PREFERRED EMBODIMENTS

Figure 1:
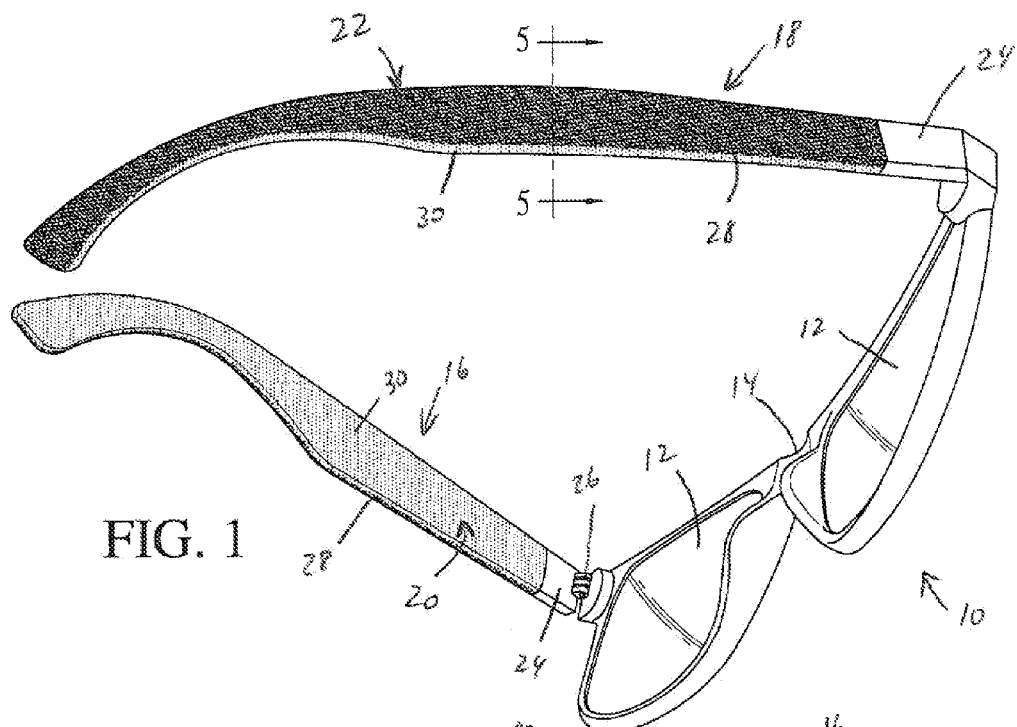
FIG. 1 is a perspective view of a pair of eyeglasses embodying the concepts of the present invention.

In describing a preferred embodiment of the invention illustrated in the drawings, specific terminology will be resorted to for the sake of clarity. However, the invention is not intended to be limited to the specific terms so selected, and it is to be understood that each specific term includes all technical equivalents which operate in a similar manner to accomplish a similar purpose.

Figure 2:
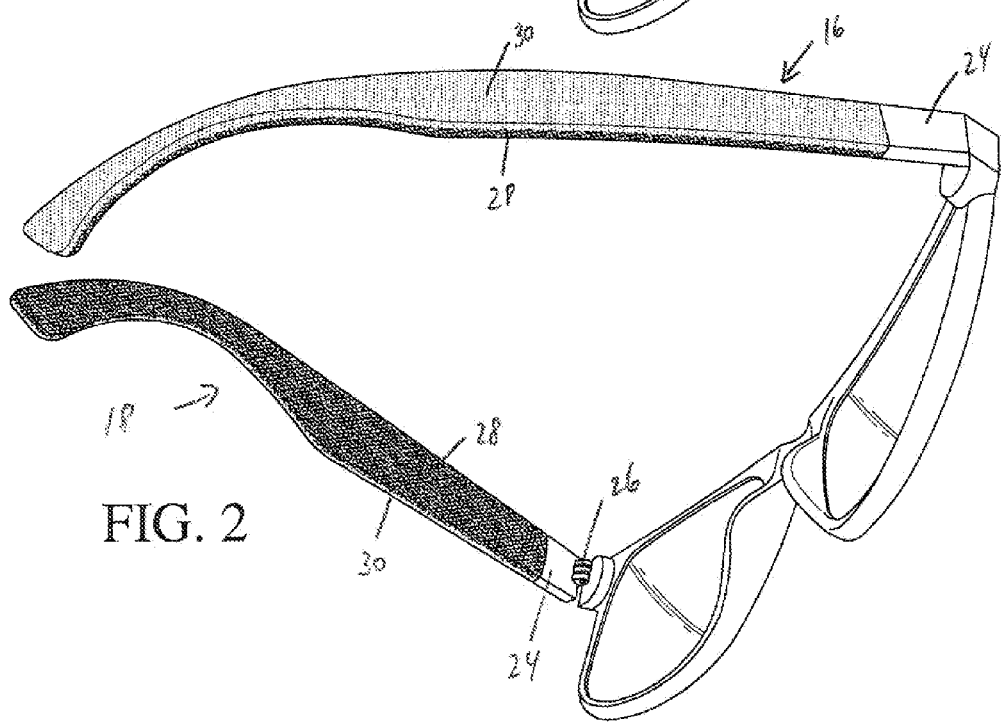
FIG. 2 is a perspective view illustrating the repositioning of the sleeves of the temples from the position shown in FIG. 1 so as to reverse the exterior color on the sides of the opposite temples.

By the present invention, a pair of eyeglasses 10, whether being prescription eyeglasses, sunglasses, reading glasses or any other type of eyepieces, is shown in FIGS. 1 and 2. As is typical of a pair of eyeglasses, the eyeglasses include a frame having two lens portions 12 interconnected by a bridge 14. At the opposite ends of the lens portions are temples 16, 18. The temples 16, 18 are pivotally mounted by hinges on the frame for opening and closing.

By the present invention, each of the temples 16, 18 include a lens cover or sleeve 20, 22, respectively. Each of the sleeves 20, 22 only partially covers the temples 16, 18. A rigid block portion 24 is located at the end of both of the temples, at the end opposite to the free end. The temples are pivotally mounted by hinges 26.

The exterior dimensions of the block portions 24 are approximately 10 mm by 3 mm. The temples 16, 18 have an exterior dimension at the block portions 24 of approximately 6 mm by 2 mm.

As shown in the figures, the exterior dimensions of the sleeves 20, 22 are the same as those of the block portions 24 (approximately 10 mm by 3 mm) when the sleeves are stretched to friction fit on the temples. The sleeves thereby engage with the block portions and form a smooth, continuous surface with the exterior surfaces of the block portions.

Each of the sleeves 20, 22 includes an interior portion or side and an exterior portion or side. The interior portion and the exterior portion are of different colors, for example, such as black and red. The color of the exterior portion of one sleeve matches the color of the exterior portion of a second sleeve. Conversely, the interior portion of the one sleeve matches the color of the interior portion of the second sleeve. It is also possible, and contemplated as being within the scope of the present invention, that the interior portion and the exterior portion of the sleeves could be of different ornamentation so as to differentiate the interior portion from the exterior portion.

This is important because as can be seen between FIGS. 1 and 2, the exterior portions 28 and the interior portions 30, as shown in FIG. 1, are reversed in FIG. 2. This is accomplished by the removal of the sleeves from the frames and moving the sleeve positioned on the right temple onto the left temple. The sleeve positioned on the left temple is moved to the right temple. By this arrangement, it is possible to change the exterior surface appearance of a single pair of glasses from a first appearance to a second appearance.

Figure 3:
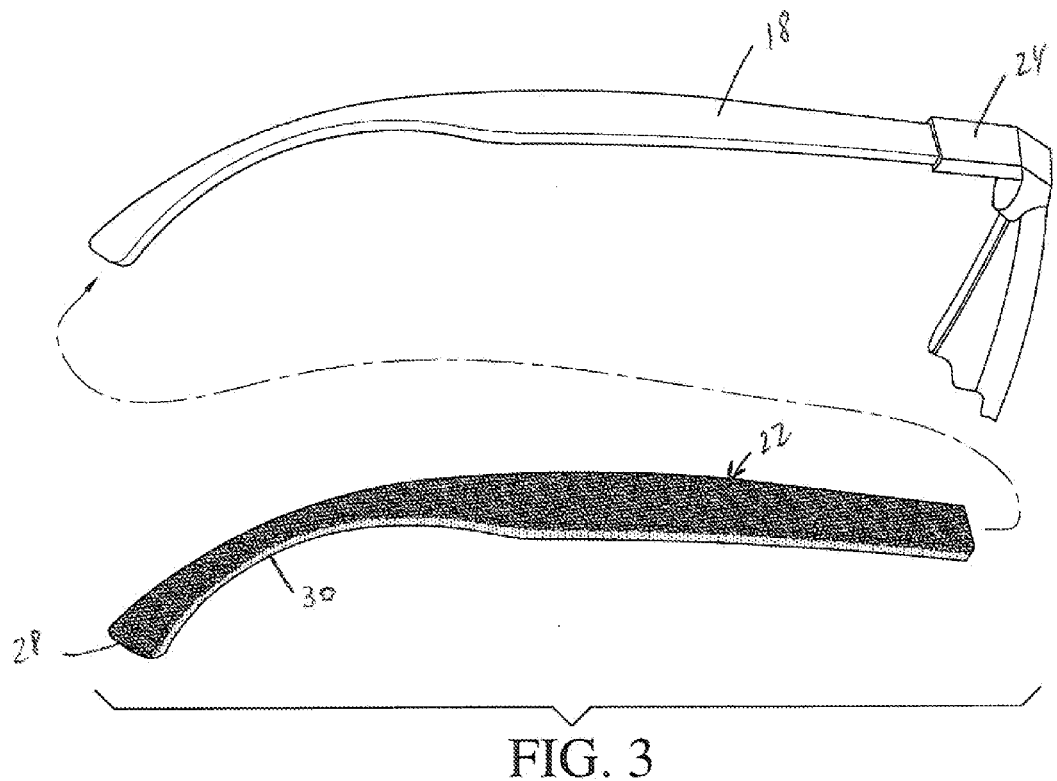
FIG. 3 is an exploded view illustrating the removal of a sleeve from one temple of the pair of eyeglasses.
Figure 4:
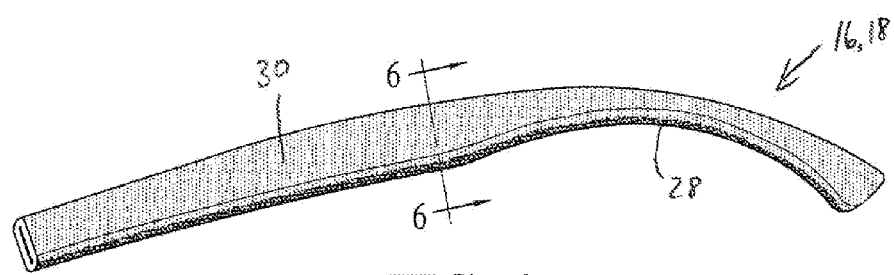
FIG. 4 is a perspective view illustrating an exemplary temple, for use with the eyeglasses of the present invention.

As shown in more detail in FIG. 3, the sleeve 22, for example, has been removed from temple 18 by sliding the sleeve along the length of the temple 18 away from block portion 24. The temple 18, as well as the temple 16, may be made of metal or a rigid plastic. In contrast, the sleeves 20, 22 are made of a soft plastic or a softer material than that of the temples 16, 18. This allows the sleeves to move along the length of the temples 16, 18 and adapt to the orientation of the temples. The temples may include an inward curvature towards each other as well as a downward curvature at the free ends of the temples 16, 18.

Figure 5:
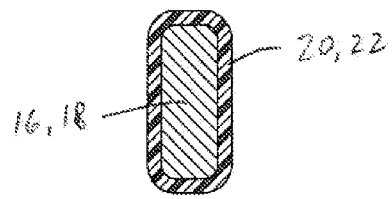
FIG. 5 is a sectional view taken along line 5-5 of FIG. 1.
Figure 6:
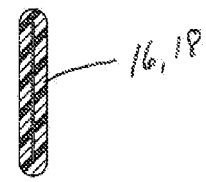
FIG. 6 is a sectional view taken along line 6-6 of FIG. 4.

Each of the sleeves, 20, 22, is hollow in cross-section (except at one terminal portion) as shown in FIG. 6. Once the sleeves are slid along the temples until engaging with the solid block portions 24, the flexible nature of the temples allow for the expansion of the interior of the temples from the position shown in FIG. 6. The sleeves are held in contact with the temples with a frictional grip on the temples by the expansion of the sleeves as shown in FIG. 5.

By the present invention, the ornamentation of the pair of glasses on an exterior surface of the temples may be modified. This is accomplished by reversing a pair of sleeves frictionally fit on the temples by switching the location of the sleeves on the respective temples. The interior surfaces of the sleeves are moved to be located on the exterior surfaces of the temples, thereby maintaining a changed, but uniform appearance on the exterior surfaces of the temples. A uniform change in appearance may be altered by a mere reversal of sleeves located on the temples.

The foregoing description should be considered as illustrative only of the principles of the invention. Since numerous modifications and changes will readily occur to those skilled in the art, it is not desired to limit the invention to the exact construction and operation shown and described, and, accordingly, all suitable modifications and equivalents may be resorted to, falling within the scope of the invention.

We claim:

1. A pair of glasses comprising
a frame having lens portions and two temple portions, said two temple portions extending continuously from adjacent to said lens portions until a free end, said two temple portions having continuous surfaces including a straight section extending from immediately adjacent to said lens portions and terminating in a downwardly curved section at the free ends, and
two sleeves slidably mounted on the two temple portions, said two sleeves each being a single piece and extending entirely along a length of said two temple portions from immediately adjacent to said lens portions to said free ends,
the two sleeves having an identical aesthetic differentiation on an exterior surface of the two sleeves and identical aesthetic differentiation on an interior surface of the two sleeves, the aesthetic differentiation on the exterior surfaces of the two sleeves being different from the aesthetic differentiation on the interior surface of the two sleeves so that the two sleeves present a different appearance when the two sleeves are reversed on the two temple portions, and
an internal cavity in said two sleeves being shaped complementary to an external shape of said two temple portions and form fitting with the two temple portions to hold the two sleeves immobilized along the entire length of the two temple portions,
the two sleeves being of a softer material than the temple portions,
the two sleeves being held on the temple portions by a frictional fit along a longitudinal length of the two sleeves,
the two sleeves expanding as the two sleeves are slid onto the temple portions such that the frictional fit extends along the longitudinal length of the two sleeves and the softer material of the two sleeves require removal of the two sleeves from the two temple portions for placement on a different temple portion in a same orientation so as to change the aesthetic differentiation of the two temple portions.

2. The pair of glasses according to claim 1, wherein the aesthetic differentiation of each of the exterior surfaces and the interior surfaces of the two sleeves is color.

3. The pair of glasses according to claim 1, wherein the temple portions include a block portion opposite to a free end of the temple portions.

4. The pair of glasses according to claim 3, wherein an exterior dimension of the two sleeves at the block portions of the temple portions is equal to an exterior dimension of the block portions.

5. The pair of glasses according to claim 1, wherein the two sleeves follow a curvature of the temple portions.

6. A pair of glasses comprising
a frame having lens portions and two temple portions, said two temple portions extending continuously from adjacent to said lens portions until a free end, said two temple portions having continuous surfaces including a straight section extending from immediately adjacent to said lens portions and terminating in a downwardly curved section at the free ends, and
two sleeves being slidably mounted on the two temple portions, said two sleeves each being a single piece and extending entirely along a length of said two temple portions from immediately adjacent to said lens portions to said free ends,
the two sleeves having an identical aesthetic differentiation on an exterior surface of the two sleeves and identical aesthetic differentiation on interior surface of the two sleeves, the aesthetic differentiation on the exterior surfaces of the two sleeves being different from the aesthetic differentiation on the interior surface of the two sleeves so that the two sleeves present a different appearance when the two sleeves are reversed on the two temple portions, and
an internal cavity in said two sleeves being shaped complementary to an external shape of said two temple portions and form fitting with the two temple portions to hold the two sleeves immobilized along the entire length of the two temple portions,
the two sleeves being stretchable and having a hollow interior to form fit onto the two temple portions,
the two sleeves being of a softer material than the temple portions,
the two sleeves being held on the temple portions by a frictional fit along a longitudinal length of the two sleeves,
the two sleeves expanding as the two sleeves are slid onto the temple portions such that the frictional fit extends along the longitudinal length of the two sleeves and the softer material of the two sleeves require removal of the two sleeves from the two temple portions for placement on a different temple portion in a same orientation so as to change the aesthetic differentiation of the two temple portions.

7. The pair of glasses according to claim 6, wherein the aesthetic differentiation of each of the exterior surfaces and the interior surfaces of the two sleeves is color.

8. The pair of glasses according to claim 6, wherein the temple portions include a block portion opposite to a free end of the temple portions.

9. The pair of glasses according to claim 8, wherein an exterior dimension of the two sleeves at the block portions of the temple portions is equal to an exterior dimension of the block portions.

\* \* \* \* \*